United States Patent [19]

Durum

[11] 4,026,123
[45] May 31, 1977

[54] UNIVERSAL JOINT

[75] Inventor: Metin Mustafa Durum, Elmhurst, Ill.

[73] Assignee: Borg-Warner Corporation, Chicago, Ill.

[22] Filed: Dec. 5, 1975

[21] Appl. No.: 637,902

[52] U.S. Cl. ............................................. 64/21; 64/8
[51] Int. Cl.² ............................................. F16D 3/30
[58] Field of Search ................. 64/21, 7, 8, 17 R

[56] References Cited
UNITED STATES PATENTS

| 3,125,870 | 3/1964 | Orain | 64/8 |
|---|---|---|---|
| 3,357,210 | 12/1967 | Dean | 64/21 |
| 3,381,497 | 5/1968 | Allen | 64/21 |
| 3,392,548 | 3/1968 | Meyer | 64/21 |
| 3,818,721 | 6/1974 | Wahlmark | 64/21 |

Primary Examiner—Samuel Scott
Assistant Examiner—Randall Heald
Attorney, Agent, or Firm—Robert L. Zieg

[57] ABSTRACT

A constant velocity universal joint for the transmission of torque between driving and driven shafts having a member secured to one of the shafts on which are mounted a plurality of trunnions each having a partial ball member slidably and rotationally mounted thereon. The ball members have a generally spherical outer surface and the other shaft has a member thereon having at least three cooperating grooves therein which receive the ball members. A torque transmitting member is connected to the one shaft and to the outer end of the trunnions whereby torque is transmitted through the outer end of the trunnions as well as at the connection of the trunnions to provide for parallel torque paths into the trunnions to prevent distortion and failure thereof during operation.

5 Claims, 2 Drawing Figures

UNIVERSAL JOINT

BACKGROUND OF THE INVENTION

The invention herein relates to the field of universal joints and more particularly to constant velocity universal joints.

It is known in the prior art (for example, U.S. Pat. No. 3,125,870) to have a universal joint having only three trunnion members mounted at an acute angle on a driving shaft having partial ball members rotationally and slidably mounted on the trunnions and received in cooperating grooves on the driven shaft, the trunnion members and the grooves extending at an acute angle with respect to the shafts to provide a constant velocity universal joint. It has been recognized in this type of universal joint that the trunnions or shafts mounting the partial ball members are subject to distortion under torque load since the outer ends thereof are unsupported and torque is applied thereto only at the inner end where connected to the shaft.

Accordingly, it is an object of the present invention to provide a constant velocity universal joint of the type described wherein there is no distortion under substantial torque loads, yet considerable angularity between drive and driven shafts is permitted.

It is an additional object of the present invention to provide a constant velocity universal joint of the type described including a means to support and apply torque to the outer or remote ends of the trunnions.

SUMMARY OF THE INVENTION

The present invention achieves the above-desired objects in a constant velocity joint of the type described by providing a torque transmitting member connected to a shaft and the remote end of the trunnion members, the universal joint having at least three trunnions extending at an acute angle with respect to the shaft and having slidable and rollable partial ball members mounted thereon for transmission of torque. The torque transmitting member is secured to its shaft and has bores therein to receive the remote ends of the trunnion members such that torque is applied to the trunnion members at both ends thereof to increase the torque capacity of the universal joint and, at the same time, prevent distortion of the trunnion members at higher torque loads.

BRIEF DESCRIPTION OF THE PREFERRED EMBODIMENT

Figure 1:
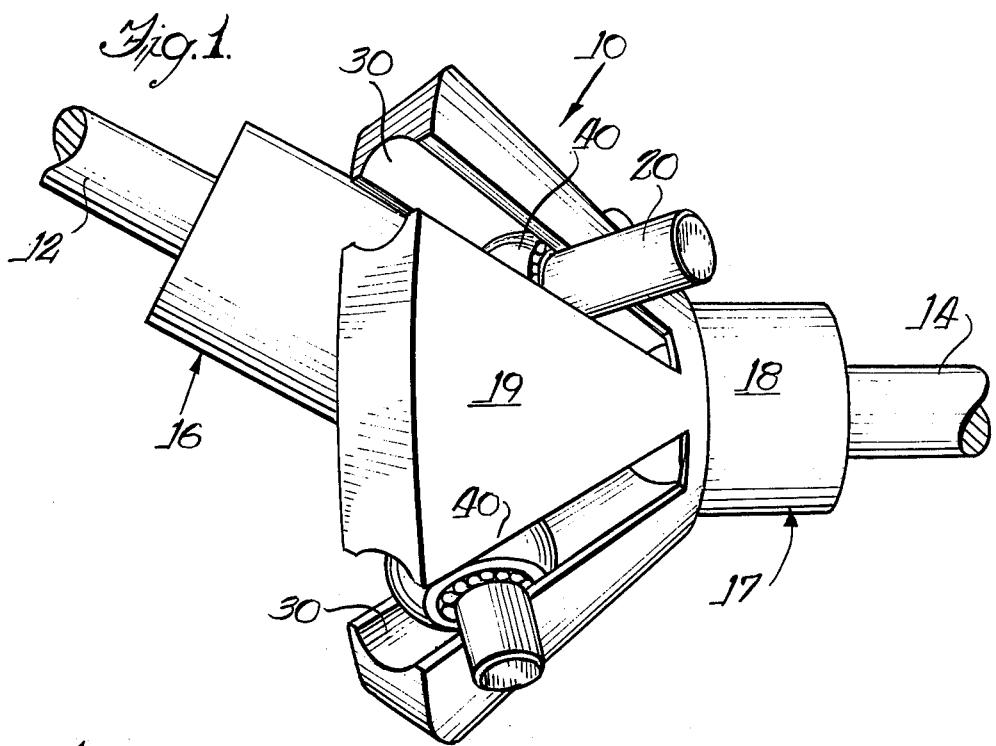
FIG. 1 shows in perspective view a universal joint of the type described herein.
Figure 2:
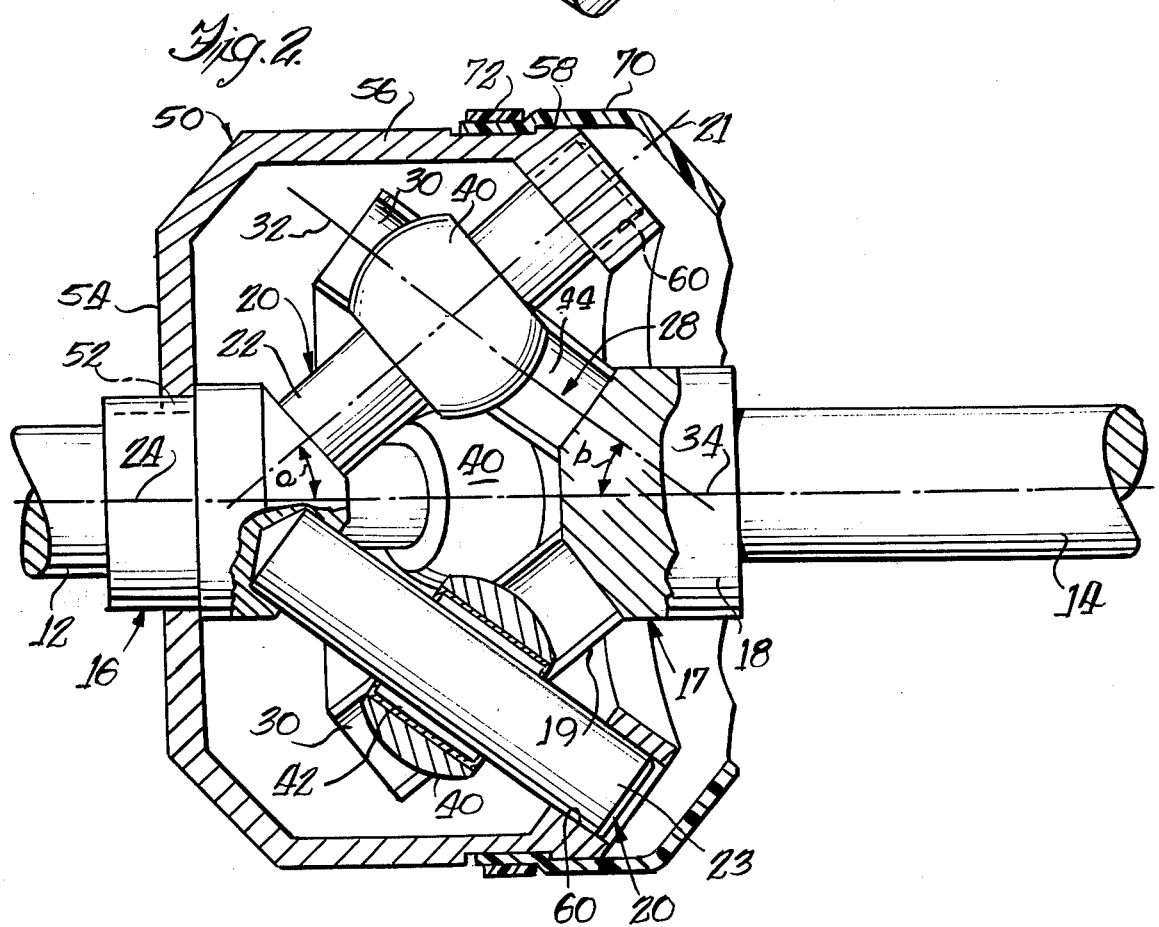
FIG. 2 shows a partial cross-sectional view of the joint of FIG. 1 embodying the principles of the present invention.

Referring to FIGS. 1 and 2, a universal joint 10 is illustrated which is self supporting and adapted to provide for constant velocity drive between a shaft 12 and a shaft 14. As will be described in greater detail, the present universal joint drivingly interconnects the shafts 12 and 14 such that when they are rotated with their axes at any angle up to the maximum permissible joint angle, the angular velocity of the two shafts is always exactly the same regardless of the position in a rotational cycle of 360°. Thus, the universal joint 10 always provides what is commonly referred to as a "constant velocity" drive as distinguished from drives provided by "non-constant velocity" universal joints which are of many types and well known in the field. Thus, when reference is made to the present universal joint 10 as a constant velocity joint, the above definition is intended. In addition, it is to be noted that the shafts 12 and 14 are not referred to herein as driving or driven shafts specifically, it being understood that the shafts may be alternately driving or driven shafts when the joint 10 is in operation, depending upon the direction of torque transfer.

Connected to shaft 12 is a member 16, and connected to shaft 14 is a member 17. Member 16 has mounted therein a plurality of support members or trunnions 20 which have a central longitudinal axis 21 which extends at an acute angle $a$ with respect to a longitudinal axis 24 of shaft 12. Trunnions 20 have an inner end portion 22 and an outer or remote end portion 23. Member 17 has a hub portion 18 connected to shaft 14 and a conical flared portion 19 extending toward driving shaft 12. Provided in portion 19 are a plurality of grooves 28 which are partly cylindrical in form, the number of grooves 28 corresponding to the cylindrical surfaces 30 on either side thereof. The grooves 28 have a longitudinal central axis 32 which extends at an acute angle $b$ with respect to a longitudinal central axis 34 of shaft 14.

A coupling member or partial ball member 40 is provided on each of the trunnions 20, the members 40 are illustrated as having centrally thereof needle bearings 42 mounting the coupling members 40 on the trunnions 20. The coupling members 40 are adapted to rotate with respect to trunnions 20 and may also slide with respect to the trunnions 20 up and down along longitudinal axis 21. The coupling members 40 have a generally spherical surface 44 thereon which has a radius substantially similar to the radius of the surfaces 30 of grooves 28 to provide for proper cooperative action therebetween.

In a preferred embodiment of the present invention, the acute angles $a$ and $b$ would be equal to obtain a non-orbitting, self supporting, homokinetic constant velocity joint with axial freedom and to permit more than three coupling members if desired. When torque is transmitted between the shafts, drive will be transmitted through the medium of the ball members 40 and the grooves 28 from the shaft 12 to shaft 14. In FIG. 2, the shafts 12 and 14 are shown in alignment with their axes 24 and 34 coincident. However, when such axes would join at an angle as, for example, illustrated in FIG. 1, when the driving shaft rotates, the drive will be transmitted to the driven shaft through the medium of the ball members 40 and grooves 28, the balls accommodating the universal action by rolling and sliding on the trunnions 20.

Although as described above, the ball members 40 have internally thereof roller bearings 42; it will be obvious to those of ordinary skill in the art that such ball members 40 may be mounted directly on the trunnions 20 without the inclusion of bearings of any type, if desired.

A torque transmitting member 50 is provided which is connected to shaft 12 as, for example, by splines 52. The torque transmitting member 50 is generally cup-shaped having a generally radially extending portion 54 having the splines 52 thereon and a generally axially extending portion 56. A supporting portion 58 is provided on the axially extending portion 56 which has a plurality of bores or apertures 60 therein. A bore 60 is provided for each of the trunnion members 20 and adapted to receive same. As will be apparent, when torque is applied to shaft 12, for example, the torque will be applied to the trunnion members 20 both through member 16 to the inner end 22 of trunnions 20 and through torque transmitting sleeve 50 to the outer or remote end 23 of trunnions 20.

With the construction provided by the present invention, it will be apparent that torque is applied to the trunnions 20 at either end thereof. Thus, trunnions 20 are properly supported to prevent distortion of the trunnions under load and the torque capacity of the joint 10 is enhanced by applying torque to the trunnions 20 at either end thereof.

As illustrated in FIG. 2, a flexible rubber boot 70 may be provided to seal the universal joint against dirt or other contaminants in operation, the boot 70 flexing when the shafts 12 and 14 intersect at an angle. The boot 70 is secured to sleeve 50 by a band 72.

As will be apparent, other forms of connection between torque transmitting member 50 and shaft 12 may be provided as, for example, the portion 54 could be welded to shaft 12 to provide a strong driving connection therebetween. Also as indicated in FIG. 2, the trunnions 20 comprise shafts or pins mounted in the member 16. Trunnion members 20 could be secured to member 16 by welding and/or other known techniques. As illustrated in the preferred embodiment, the trunnions 20 are four in number. A workable joint may also be provided by utilizing only three trunnions, if desired.

In FIG. 1, a perspective view is given of the universal joint 10 of the present invention wherein the boot 70 and the torque transmitting member 50 are removed to clearly illustrate the construction of the present device, and it is to be recognized that FIG. 1 illustrates the embodiment of FIG. 2 with member 50 removed.

From the above, it will be apparent that the present invention provides a unique constant velocity universal joint in which three or more trunnion or pin members are used having a rollable, slidable ball member mounted thereon wherein distortion of the pins or trunnions is prevented by providing a torque driving connection at either end of the pins so that the pins are properly supported and prevented from changing angle with respect to their shaft.

What is claimed is:

1. A universal joint for the transmission of torque between two shafts comprising a first member coupled to one of said shafts, a second member coupled to the other of said shafts, at least three supports connected to said first member at a first acute angle with respect to said one shaft, said supports having an end remote from said first member, a coupling member rotationally and slidably mounted on each of said supports, said second member having at least three grooves therein extending at a second acute angle with respect to said outer shaft, said coupling members being received within said grooves whereby torque can be transmitted between said shafts when said shafts intersect at an angle, and a torque transmitting member extending between said one shaft and said remote end of said supports for transmitting torque to said remote end.

2. A universal joint as claimed in claim 1, wherein the supports comprise trunnions and the coupling members comprise partial ball members having a generally spherical outer surface in engagement with the grooves in said second member.

3. A universal joint as claimed in claim 1, wherein said torque transmitting member comprises a cup-shaped member fixed to said first member and having apertures therein to receive the end of said supports.

4. A universal joint as claimed in claim 1, wherein the first and second acute angles are the same.

5. A universal joint as claimed in claim 3, wherein said torque transmitting member has apertures therein to receive said remote end of said trunnions.

* * * * *

UNITED STATES PATENT OFFICE
CERTIFICATE OF CORRECTION

PATENT NO. : 4,026,123
DATED : May 31, 1977
INVENTOR(S) : METIN M. DURUM

It is certified that error appears in the above–identified patent and that said Letters Patent are hereby corrected as shown below:

Column 4, line 18, cancel "outer" and insert -- other --.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks